US008287197B2

(12) United States Patent
Sasaki et al.

(10) Patent No.: US 8,287,197 B2
(45) Date of Patent: Oct. 16, 2012

(54) INTERCHANGEABLE LENS AND CAMERA SYSTEM

(75) Inventors: Kunihiko Sasaki, Utsunomiya (JP); Takeya Nakayama, Utsunomiya (JP); Hiromu Yasuda, Kawasaki (JP); Yuki Nagao, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/703,662

(22) Filed: Feb. 10, 2010

(65) Prior Publication Data
US 2010/0209097 A1    Aug. 19, 2010

(30) Foreign Application Priority Data
Feb. 17, 2009   (JP) .................................. 2009-034038

(51) Int. Cl.
*G03B 17/00*    (2006.01)
*H04N 5/228*    (2006.01)
*G02B 7/02*     (2006.01)

(52) U.S. Cl. .................... 396/529; 348/208.11; 359/827
(58) Field of Classification Search .................. 396/529, 396/133, 52, 55; 348/340, 357, 208.99, 208.3, 348/208.11, 208.12; 359/819, 823, 824, 359/554–557, 827
See application file for complete search history.

(56) References Cited

FOREIGN PATENT DOCUMENTS
JP    3165433 B2    5/2001

*Primary Examiner* — Rochelle-Ann J Blackman
(74) *Attorney, Agent, or Firm* — Canon USA, Inc., IP Division

(57) ABSTRACT

An interchangeable lens which is removably mounted on a camera body including an image sensor includes a tilt unit configured to move a lens unit in a tilt direction with respect to the image sensor, a shift unit configured to move the lens unit in a shift direction with respect to the image sensor, a changing unit configured to change a relative angle between the shift unit and the tilt unit by relatively rotating the shift unit and the tilt unit, a detection unit configured to detect the relative angle, and a control unit configured to transmit to the camera body a detection result of the relative angle detected by the detection unit.

13 Claims, 7 Drawing Sheets

INTERCHANGEABLE LENS AND CAMERA SYSTEM

BACKGROUND OF THE INVENTION

1. Field of the Invention

The present invention relates to, among interchangeable camera lenses which are removably mounted on a digital single-lens reflex camera, an interchangeable camera lens including a tilt/shift mechanism which can tilt and shift.

2. Description of the Related Art

A technique for an interchangeable lens has been discussed which is capable of, with respect to an imaging plane (image sensor), tilting an optical axis of a lens which is usually perpendicular to the imaging plane, or shifting (parallely moving) the optical axis of the lens which usually passes through the center of the imaging plane. These functions are collectively referred to as "capability of tilt/shift imaging".

If such a tilt/shift function is used, arbitrary control of the depth of field and perspective correction can be performed. However, under such control, a problem also occurs. More specifically, by tilting or shifting the lens, an amount of light reaching the imaging plane or a light metering sensor decreases due to slant of the main light flux or vignetting of the light flux. Consequently, imaging with an appropriate exposure can be difficult.

In addition, when shifting is performed, an image height in a shift direction becomes substantially higher. Due to the effects of various aberrations and changes in a peripheral light amount, the image can look drastically different on a right and a left sides of the shift direction. Further, since the conditions for the range-finding sensor change, there is the problem that it is difficult to achieve an appropriate autofocus.

To resolve the above-described problems, Japanese Patent No. 3165433 discusses detecting the shift amount and the tilt amount, and selecting an exposure correction amount using a matrix table. Further, Japanese Patent No. 3165433 discusses a technique which may provide a tilt/shift lens with a revolving function (rotation function around the optical axis). In such a case, the exposure correction amount can be selected based on the shift amount, the tilt amount, and the revolving amount. When the revolving function is provided, the tilt direction and the shift direction (direction in an orthogonal plane to the optical axis) are fixed in a given relationship. If either of the tilt direction and the shift direction is detected, the other direction will also be known.

However, currently, assuming that imaging is performed in a great variety of situations, it is desirable that a user can freely change a relative angle between the tilt direction and the shift direction (angle in an orthogonal plane to the optical axis). In such a case, to calculate an appropriate exposure correction amount, in addition to a configuration for detecting movement in the tilt direction and the shift direction, a configuration for detecting a relative angle between the tilt direction and the shift direction also becomes necessary.

SUMMARY OF THE INVENTION

According to an aspect of the present invention, an interchangeable lens which is removably mounted on a camera body including an image sensor includes a tilt unit configured to move a lens unit in a tilt direction with respect to the image sensor, a shift unit configured to move the lens unit in a shift direction with respect to the image sensor, a changing unit configured to change a relative angle between the shift unit and the tilt unit by relatively rotating the shift unit and the tilt unit, a detection unit configured to detect the relative angle, and a control unit configured to transmit to the camera body a detection result of the relative angle detected by the detection unit.

According to another aspect of the present invention, an interchangeable lens which is removably mounted on a camera body including an image sensor includes a tilt unit configured to move a lens unit in a tilt direction with respect to the image sensor, a shift unit configured to move the lens unit in a shift direction with respect to the image sensor, and a changing unit configured to change a relative angle between the shift unit and the tilt unit by relatively rotating the shift unit and the tilt unit, wherein the changing unit comprises an engagement member which is fixed to the tilt unit and configured to radially engage with the shift unit, and an urging member in which its rotation motion around an optical axis is regulated with respect to the shift unit and configured to urge the engagement member to a direction toward the shift unit, wherein the engagement member is integrated with the tilt unit around the optical axis, and relatively rotates with respect to the urging member and the shift unit.

According to the present invention, a range of situations in which photographing can be performed is expanded since the tilt direction and the shift direction can be rotated in an arbitrary angle. Further, the appropriate correction amount can be calculated if such a mechanism is provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
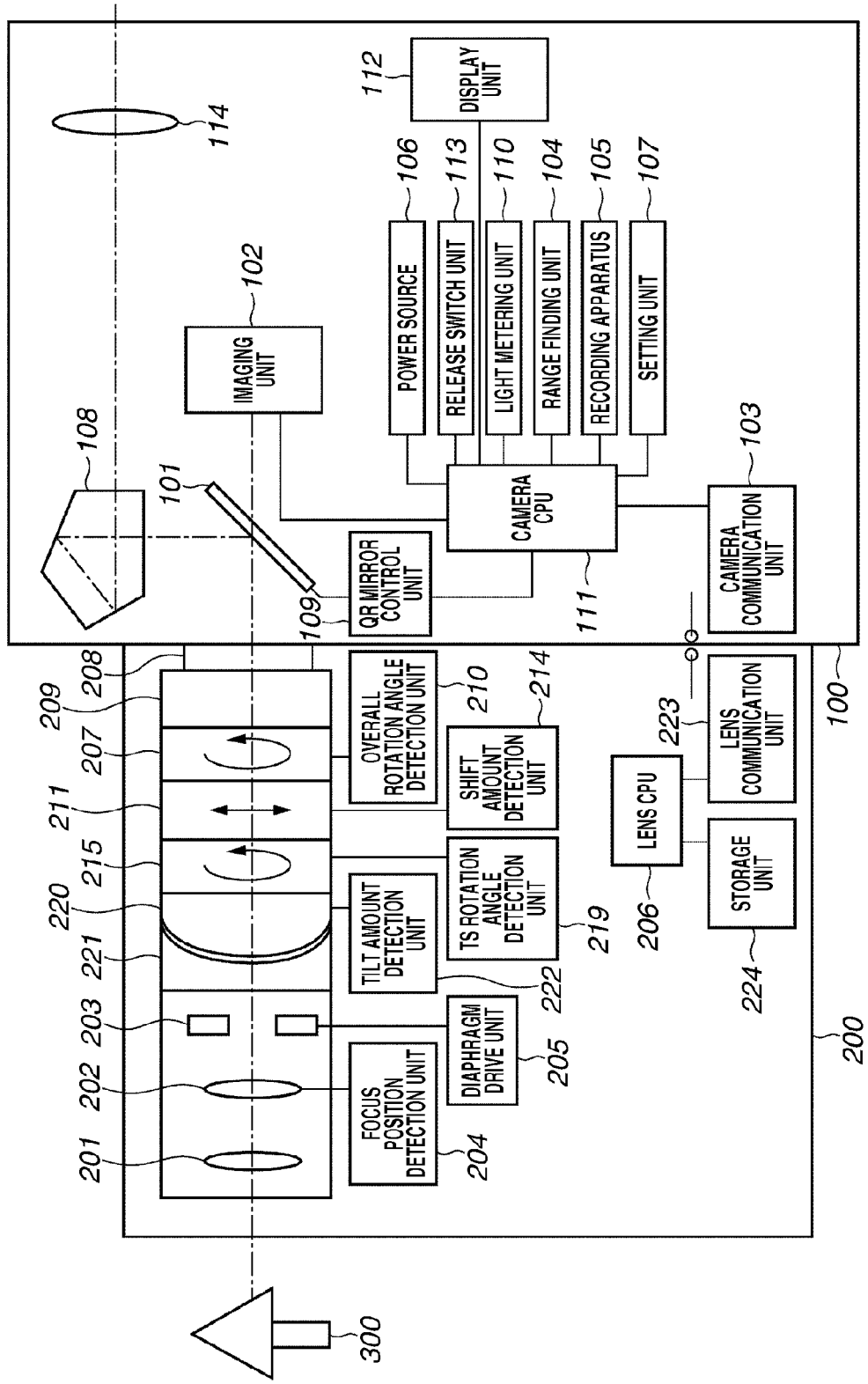
FIG. 1 is a block diagram of a camera system which can be used in an exemplary embodiment according to the present invention.
Figure 2:
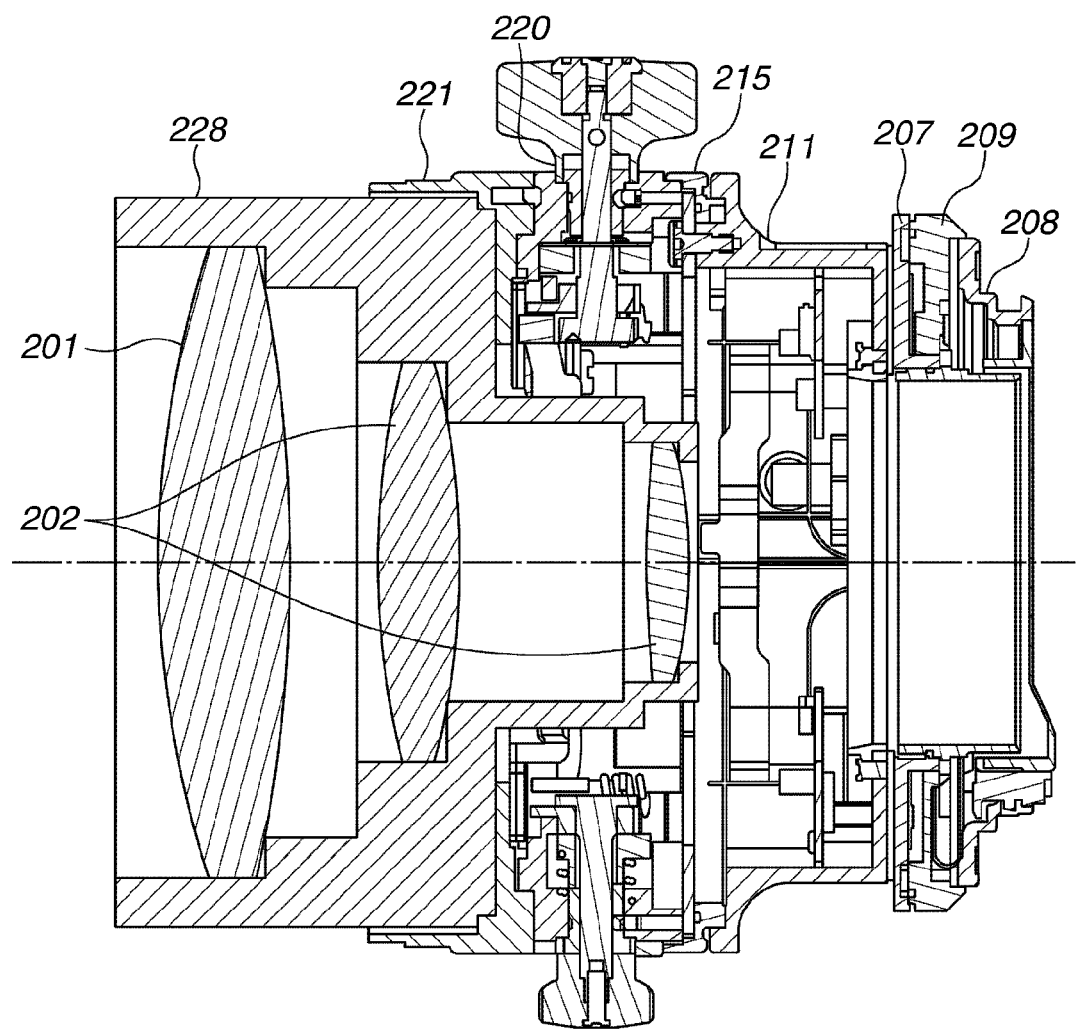
FIG. 2 is a transverse cross sectional view of an interchangeable camera lens according to the exemplary embodiment.
Figure 3:
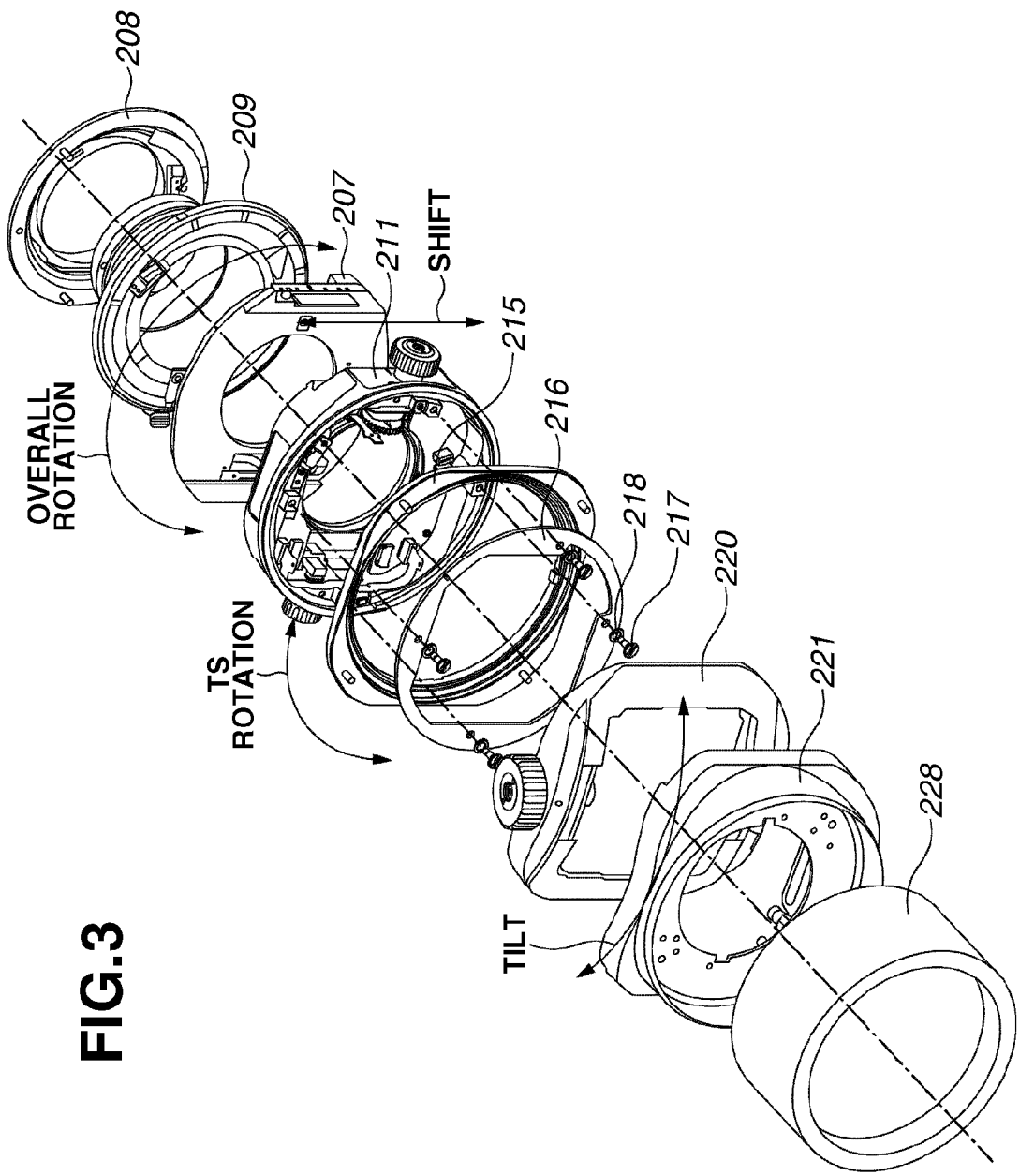
FIG. 3 is an exploded perspective view of the interchangeable camera lens according to the exemplary embodiment.

FIG. 1 is a block diagram illustrating a configuration of a camera system which can use an exemplary embodiment according to the present invention. FIGS. 2 and 3 are a transverse cross sectional view and an exploded perspective view of an interchangeable camera lens according to the present exemplary embodiment. In FIG. 1, a digital single-lens reflex camera includes a camera body 100, and an interchangeable camera lens (interchangeable lens) 200 which is removably mounted on the camera body 100. The camera body and the interchangeable lens constitute a camera system.

The interchangeable lens 200 includes a first lens unit 201, a focus lens unit 202, and a diaphragm 203. The first lens unit 201 and the focus lens unit 202 are collectively referred to as a "lens group". Further, the interchangeable lens 200 includes a focus position detection unit 204 for detecting a position of the focus lens unit 202, and a diaphragm drive unit 205. The diaphragm drive unit 205 controls an opening diameter of the diaphragm 203 based on a signal from a lens central processing unit (CPU) 206. The interchangeable lens 200 also includes units and parts 207 to 222, which illustrate the characteristic features of the present invention, such as movement in and relative rotation of the tilt and shaft directions, and overall rotation of the whole lens. A mechanism of these units and parts 207 to 222 will be described below.

The lens CPU 206 (control unit) transmits and receives information to/from a camera CPU 111 via a lens communication unit 223 and a camera communication unit 103. The lens CPU 206 also controls an overall operation in the lens. The focus position detection unit 204 is mainly used to control a light amount of an external flash (the flash may be initially included in the camera). The interchangeable lens 200 also includes a storage unit 224 configured by a read-only memory (ROM) and the like. The storage unit 224 stores, as a matrix table, an identification number (ID) specific to the interchangeable lens 200, focal length information, and a pupil position movement amount when tilt or shift movement occurred. Information stored in the storage unit 224 can be read by the lens CPU 206 as needed.

Incident light from an object 300 enters the camera body 100 via the lens unit 201, the focus lens unit 202, and the diaphragm 203 in the interchangeable lens 200. In the camera body 100, when a quick return mirror 101 is in a retracted state, the incident light is captured by an image sensor 102 and imaged. When the quick return mirror 101 is in its normal position, the incident light is bent its direction at 90 degrees, and enters a pentaprism 108. A light flux which has passed through the pentaprism 108 further passes through a finder optical system 114, and is then viewed by a person capturing the image as an optical finder image.

The camera body 100 includes a quick return mirror control unit 109, a light metering unit 110, and a release switch unit 113. The quick return mirror control unit 109 controls up and down of the quick return mirror 101 based on a signal from the camera CPU 111. The light metering unit 110 measures an amount of light which passed through the mounted interchangeable lens 200, and transmits the measured light amount to the camera CPU 111 as light metering information. The release switch unit 113 is a two-stage switch. When a first stage is turned "ON", an image-capturing preparation command (SW1) signal for starting light metering and focus detection is output. When a second stage is turned "ON", an exposure start command (SW2) signal for starting exposure and recording by the image sensor 102 is output. These SW1 and SW2 signals are input into the camera CPU 111.

An output signal obtained by photoelectric conversion at the image sensor 102 is amplified by a not-illustrated image processing circuit, and is input as a digital video signal into the camera CPU 111. In the camera system according to the present exemplary embodiment, a moving image or a still image is formed using the video signal. A focus detection unit 104 (autofocus (AF) sensor) detects an in-focus state by a phase difference detection method using the light flux which is bent when it passed through a half mirror portion of the quick return mirror 101.

Next, a mechanism of a lens barrel which can shift and tilt according to the present exemplary embodiment illustrated in FIG. 3 will be described. An overall rotation unit 207 includes a function for rotating the whole lenses, which are further toward an object side than the overall rotation unit 207 is, around the optical axis. The overall rotation unit 207 is connected so that it can be rotated ±90° with respect to a fixing portion 209 which is fixed to a mount 208. The mount 208 is a connection portion with the digital camera. In the present exemplary embodiment, the overall rotation unit 207 includes a total of seven mechanisms every 30°, and a lock mechanism which can lock the rotation at the 0°, +90°, and −90° positions. An overall rotation angle detection unit 210 detects a rotation amount (angle) around the optical axis within a range of ±90°.

Figure 5:
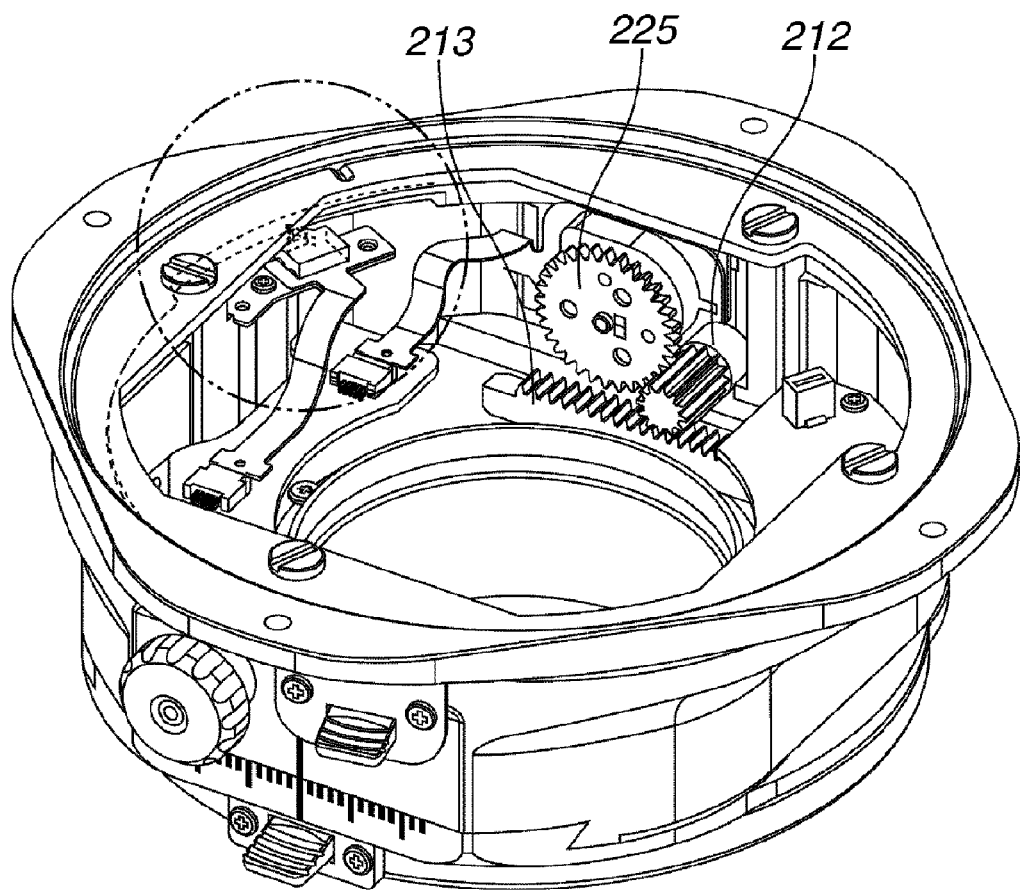
FIG. 5 is an interior perspective view of the interchangeable camera lens according to the exemplary embodiment.

A shift unit 211 includes a function for moving the whole lenses, which are further toward the object side than the shift unit 211 is, in parallel in a perpendicular direction with respect to the optical axis. The shift unit 211 is shiftably connected to the overall rotation unit 207. FIG. 5 is an interior perspective view illustrating a drive mechanism of the shift unit.

In the present exemplary embodiment, the shift unit 211 and the overall rotation unit 207 are shiftably connected using a dovetail groove. The shift unit 211 includes a shift operation knob which is directly coupled in the same axis with a shift drive gear 212 and a rack 213. The shift drive gear 212 and the rack 213 convert rotational motion by the knob into translatory motion, thereby enabling the shift operation. The shift unit 211 also includes a click mechanism at the position of shift amount ±0, and a shift lock mechanism which stops shift movement at an arbitrary position. An actual shift movement amount, including a determination of positive/negative movement direction, is detected by a shift amount detection unit 214.

A first TS rotation unit 215 (engagement member) performs movement for relatively rotating a tilt unit 221 and the shift unit 211 (hereinafter, "TS rotation"). The first TS rotation unit 215 is connected in a manner which allows TS rotation in the range of 0° to 90° with respect to the shift unit 211. In the present exemplary embodiment, the first TS rotation unit 215 includes a total of three click mechanisms every 45°, and a lock mechanism which can lock the rotation at the 0° and 90° positions.

Figure 4:
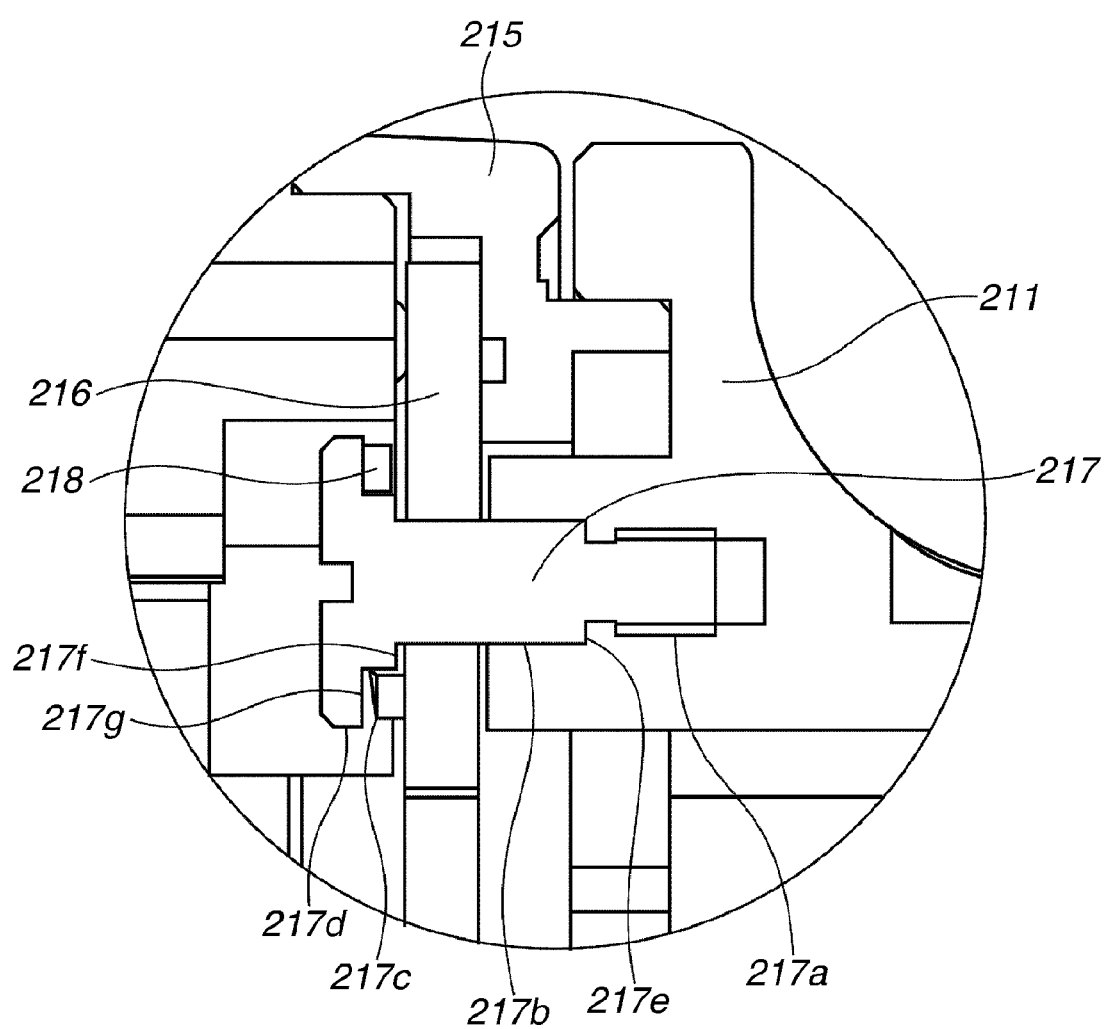
FIG. 4 is a detailed view of a connection part of a shift unit and a tilt unit according to the exemplary embodiment.

As illustrated in FIG. 4, the first TS rotation unit 215 includes a radial engagement with the shift unit 211. A retainer plate 216 (urging member) urges the first TS rotation unit 215 toward the shift unit 211 via four axial screws 217 and an elastic member 218 to enable the first TS rotation unit 215 to rotate and slide around the optical axis without leaning or rattling in the optical axis direction. The axial screw 217 is configured by a first cylindrical portion 217a having a first radius, a second cylindrical portion 217b having a second radius, a third cylindrical portion 217c having a third radius, and a fourth cylindrical portion 217d having a fourth radius. The larger the radius number, the larger the value that is indicated.

As illustrated in FIG. 4, the axial screw 217 is positioned in the shift unit 211 by the second cylindrical portion 217b and an abutting portion 217e, and fixed in the shift unit 211 by a thread portion in the first cylindrical portion 217a. Further, movement in the rotation direction around the optical axis of the retainer plate 216 is regulated by the second cylindrical portion 217b, and movement in the optical axis direction is allowed. In addition, a step referred to as a retaining plate stopping portion 217f is formed by the second cylindrical portion 217*b* and the third cylindrical portion 217*c* and stops the retainer plate 216 from falling out.

More specifically, when an external impact is applied, the retaining plate stopping portion 217*f* hits the retainer plate 216 before the elastic member 218 is completely compressed by the retainer plate 216, so that the retainer plate 216 can be prevented from falling out. In the present exemplary embodiment, a spring washer is used as the elastic member 218. The elastic member 218 passes through an inner peripheral section of the third cylindrical portion 217*c*. Since the elastic member 218 is compressed in a gap between an elastic member urging portion 217*g*, which is a step formed by the third cylindrical portion 217*c* and the fourth cylindrical portion 217*d*, and the retainer plate 216, the first TS rotation unit 215 is urged toward the shift unit 211. The elastic member 218 is not limited to a spring washer. Other members which fulfill the same role may also be used, such as a compression coil spring, a plate spring and the like.

A second TS rotation unit 220 performs TS rotation along with the first TS rotation unit 215. The second TS rotation unit 220 includes a part of a circle of a convex surface as a sliding surface with the tilt unit 221. The second TS rotation unit 220 is fixed to the first TS rotation unit 215, and performs TS rotation together with the first TS rotation unit 215. More specifically, in the present exemplary embodiment, the retainer plate 216 is fixed to the shift unit 211. The first TS rotation unit 215 can realize TS rotation by rotating and moving with respect to the shift unit 211 in an integrated manner with the tilt unit 221. Further, the tilt unit 221 and the shift unit 211 are rotated relative to each other, so that an angle between the tilt direction and the shift direction in the plane orthogonal to the optical axis can be adjusted.

Further, in the present exemplary embodiment, an engagement member is radially engaged with the shift unit 211. Using an urging member, the engagement member is urged toward the shift unit 211. The engagement member integrated with the tilt unit 221 is rotated around the optical axis to realize the TS rotation. However, a relationship between the tilt unit 221 and the shift unit 211 may be reversed. More specifically, the engagement member may be radially engaged with the tilt unit 221, and using a urging member, the engagement member is urged toward the tilt unit 221, so that the engagement member integrated with the shift unit 211 is rotated around the optical axis to realize the TS rotation.

The TS rotation amount around the optical axis is detected in a range of 0° to 90° by a TS rotation angle detection unit (relative angle detection unit) 219. Based on the above-described configuration, in the present exemplary embodiment, enlargement in the radial direction and in the optical axis direction can be minimized. Further, since the first TS rotation unit 215 and the shift unit 211 are urged in a direction toward each other, occurrence of leaning or rattling can be prevented, and the TS rotation can be realized without causing deterioration in the optical performance.

The tilt unit 221 includes a function for tilting the whole lenses, which are further toward the object side than the tilt unit 221, with respect to the camera body 100 with centering on a center of tilt rotation perpendicular to the lens optical axis. More specifically, a contact surface between the second TS rotation unit 220 and the tilt unit 221 is formed as a part of the circle of a convex surface and a concave surface having the same center axis and the same radius.

Thus, in the present exemplary embodiment, a relative angle changing unit for changing the relative angle between the tilt unit 221 and the shift unit 211 is formed by the first TS rotation unit 215 and the retainer plate 216. Further, the relative angle changing unit is realized in which enlargement in the radial direction and in the optical axis direction is minimized, and in which there is little occurrence of leaning or rattling, by using the axial screw 217 used in the present exemplary embodiment.

Further, in the present exemplary embodiment, tilt drive can be realized by converting rotation of a gear directly coupled to a tilt operation knob, which is a drive unit, into rotation by an external gear which has a large reduction ratio and an axis in the center of tilt rotation. The tilt rotation center axis is desirably located near either of front or back lens principal point positions. In the present exemplary embodiment, the interchangeable lens 200 further includes a click mechanism at a tilt amount ±0° position and a tilt lock mechanism for stopping tilt movement at an arbitrary position. Further, the actual tilt movement amount, including a determination of positive/negative movement direction, is detected by a tilt amount detection unit 222. Using the above-described units and parts 207 to 222, tilt and shift can be combined in any direction. The interchangeable lens 200 further includes a lens barrel 228 for holding the lens unit 201, the focus lens unit 202, and the diaphragm 203.

Figure 6:
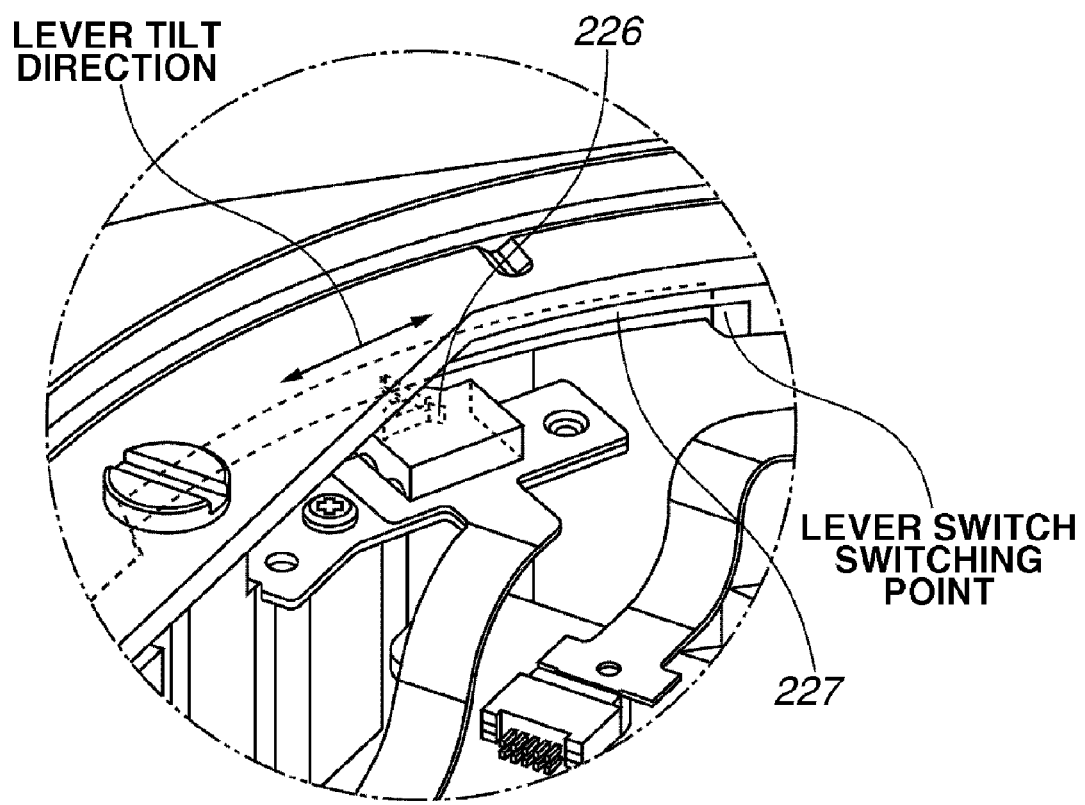
FIG. 6 is an enlarged view of a sensor arrangement portion in FIG. 5.

Referring to FIGS. 5 and 6, the configuration of the detection unit for detecting the tilt amount, shift amount, overall rotation angle, and TS rotation angle according to the present invention will be described. FIGS. 4 and 5 are an interior perspective view illustrating a state in which components on the object side from the first TS rotation unit 215 through the second TS rotation unit 220 are removed.

An overall rotation angle $\theta_{ALL}$, which can be changed by the overall rotation unit 207, is detected each 30° by a brush fixed to the fixing portion 209 and an encoder pattern (zone pattern) attached to the overall rotation unit 207. In the present exemplary embodiment, there are lock mechanisms at the −90°, ±0°, and +90° positions and click mechanisms every 30°. Therefore, a detection switch position is provided at the center of each of the click positions (the detection signal switches at −75°, −45°, −15°, +15°, +45°, and +75° positions).

The shift amount which can be changed by the shift unit 211 is detected by the shift amount detection unit 214 and a potentiometer for detecting a rotation amount. In the present exemplary embodiment, the potentiometer is attached to a detection gear 225 which is branched from the shift drive gear 212 directly coupled with the shift operation knob in the same axis. In the present exemplary embodiment, axis distances between the shift drive gear 212 and the detection gear 225, and between the shift drive gear 212 and the rack 213 are set to be the same. This configuration enables cancellation of backlash, so that a difference between the actual shift amount and the detection amount can be minimized.

As illustrated in FIG. 6, a TS rotation angle $\theta_{TS}$ which can be changed by the TS rotation units (215 and 220) is detected by a lever switch 226 which detects three positions. More specifically, a concave portion 227 into which a lever enters is provided on the first TS rotation unit 215 with respect to the lever switch 226 which is attached to the shift unit 211 facing outwards. When the first TS rotation unit 215 is relatively rotated to a switch angle with respect to the shift unit 211, the concave portion is discontinued, and the lever switch is pulled down. In the present exemplary embodiment, there are the rock mechanisms at the 0° and the 90° positions and the click mechanisms at every 45° position. Therefore, a detection switch position is at the midpoint between the respective click positions and lock positions (the detection signal switches at the 22.5° and 67.5° positions).

In the present exemplary embodiment, a TS rotation angle detection unit is mounted on the shift unit 211 on which a base circuit of the lens is arranged (control unit is mounted). This is because if a plurality of parts are disposed between the base and the shift unit 211, a flexible circuit board or the like for communicating therebetween becomes necessary. This means that in the present exemplary embodiment, in which the TS rotation units, the tilt unit 221, and the shift unit 211 move as illustrated in FIG. 3, wirings need to have a long enough length so that the wirings do not break even when these units are moved. In the present exemplary embodiment, there is no risk of the wirings breaking, and a space-saving design free from unnecessary wirings can be realized.

Figure 7:
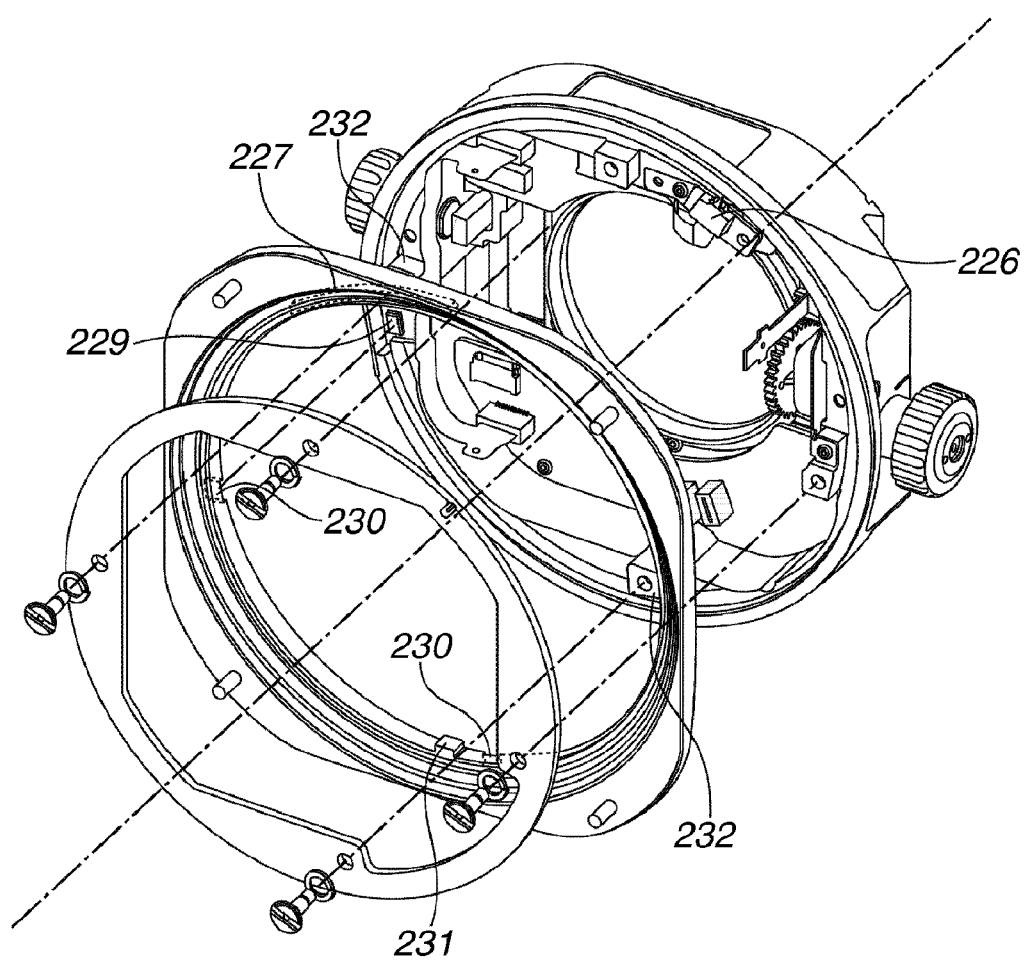
FIG. 7 is an exploded perspective view illustrating a rotation regulation unit, a lock unit, and a relative angle detection unit according to the exemplary embodiment.

FIG. 7 illustrates the arrangement of a rotation regulation unit which regulates the TS rotation amount (0° to 90°), a lock unit which locks the TS rotation, and the TS rotation angle detection unit 219, which are provided on the first TS rotation unit 215 and the shift unit 211. In the present exemplary embodiment, these three components are arranged in the same region in the optical axis direction.

The rotation regulation unit is regulated by attaching a protrusion portion 231 provided on an inner circumference of the first TS rotation unit 215 to a protrusion 232 provided on the shift unit 211 on a circumference having the same radius as the protrusion portion 231. In the present exemplary embodiment, the protrusion 232 is also used as a screw box for the axial screw 217. As illustrated in FIG. 7, the protrusions 232 are provided in 90° intervals. A side surface of the protrusion portion 231 abuts the protrusion 232 at 0° and 90°, so that the protrusion portion 231 is regulated the TS rotation.

The lock unit is locked when a convex portion of a switch 229 which moves back and forth in the optical axis direction on the shift unit 211, is inserted into a locking hole 230. The locking holes 230 are provided to be engaged with the convex portion of the switch 229 on the first TS rotation unit 215 at positions which are shifted a predetermined interval. In the present exemplary embodiment, two locking holes 230 are provided at a 90° interval. Further, the above-described TS rotation angle detection unit 219 and the concave portion 227 are arranged on the remaining circumference portion of the same region in the optical axis direction. Consequently, a thickness in the optical axis direction can be minimized while including these three components.

The tilt amount which can be changed by the tilt unit 221 is measured by the tilt amount detection unit 222 and a potentiometer. In the present exemplary embodiment, an axial part of a tilt drive gear directly coupled to the tilt operation knob in the same axis is directly inserted into the potentiometer. The potentiometer directly detects the rotation amount of the tilt operation knob.

Based on the above described configuration, the detected shift amount, tilt amount, overall rotation angle $\theta_{ALL}$, and TS rotation angle $\theta_{TS}$ are calculated by the lens CPU 206 as a change amount of an exit pupil position. The calculated data is stored in the storage unit 224. The lens CPU 206 acquires exit pupil position information as necessary, and uses the information during imaging for changing the exposure control method, changing the shutter drive control method, and changing the focus drive control method. Further, the exit pupil position information is also used when performing marginal illumination correction and various aberration corrections on the acquired image data.

As a usage example of the above-described configuration, a change in the exposure control method used in the present exemplary embodiment will now be described. Detection results from the overall rotation angle detection unit 210, the shift amount detection unit 214, the TS rotation angle detection unit 219, and the tilt amount detection unit 222 are input into the lens CPU 206. Then, a predetermined exposure correction value is selected based on a matrix. The determined exposure correction value is transmitted to the camera body side via the lens communication unit 223. On the camera side, when the release switch unit 113 is switched to ON, information obtained by the light metering unit 110 is processed based on the exposure correction value. The processed information is input into an exposure information setting circuit in the camera CPU. The exposure information setting circuit transmits determination of the imaging mode set by a user, such as a shutter priority mode and a diaphragm priority mode, and shutter time, a diaphragm value, and ISO sensitivity which are newly determined based on information about the ISO sensitivity and the like, to an exposure control circuit in the camera CPU. By carrying out the above processing flow, imaging at an appropriate exposure can be performed even during tilt/shift imaging.

In the present exemplary embodiment, an example is described in which lever switches at three positions are used in the detection of the TS relative angle. However, as long as the rotation amount is detected, the detection can be performed using a brush and an encoder pattern like in the detection of the overall rotation angle. Further, a potentiometer, a Hall element, or a position sensitive detector (PSD) may also be used. In addition, the rotation angle can be more accurately detected by using a mechanism which detects a relative angle, such as an SR scale. However, when minimization of the thickness in the optical axis direction and in the radial direction by arranging the rotation regulation unit, the lock unit, and the TS rotation angle detection unit in the same region in the optical axis direction as described above is considered, the lever switch used in the present invention can be effective from the perspective of saving space.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034038 filed Feb. 17, 2009, which is hereby incorporated by reference herein in its entirety.

What is claimed is:

1. An interchangeable lens which is removably mounted on a camera body including an image sensor, the interchangeable lens comprising:
    a tilt unit configured to move a lens unit in a tilt direction with respect to the image sensor;
    a shift unit configured to move the lens unit in a shift direction with respect to the image sensor;
    a changing unit configured to change a relative angle between the shift unit and the tilt unit by relatively rotating the shift unit and the tilt unit around an optical axis having an optical axis direction;
    a detection unit configured to detect the relative angle; and
    a control unit configured to transmit to the camera body a detection result of the relative angle detected by the detection unit.

2. The interchangeable lens according to claim 1, wherein the detection unit is mounted on a member on which the control unit is mounted.

3. The interchangeable lens according to claim 1, wherein the shift unit, the changing unit, and the tilt unit are arranged in this order in the optical axis direction.

4. An interchangeable lens which is removably mounted on a camera body including an image sensor, the interchangeable lens comprising:

a tilt unit configured to move a lens unit in a tilt direction with respect to the image sensor;

a shift unit configured to move the lens unit in a shift direction with respect to the image sensor; and a changing unit configured to change a relative angle between the shift unit and the tilt unit by relatively rotating the shift unit and the tilt unit around an optical axis, wherein the changing unit comprises:

an engagement member which is fixed to the tilt unit and configured to radially engage with the shift unit, and an urging member in which its rotation motion around the optical axis is regulated with respect to the shift unit and configured to urge the engagement member to a direction toward the shift unit, wherein the engagement member is integrated with the tilt unit around the optical axis, and relatively rotates with respect to the urging member and the shift unit.

5. The interchangeable lens according to claim 4, wherein the changing unit urges the engagement member toward the shift unit via the urging member by an axial screw and an elastic member, and the axial screw comprises a first cylinder which has a first diameter and in which a screw thread is formed, a second cylinder that has a second diameter which is larger than the first diameter and an abutting surface perpendicular to an axis of the axial screw and configured to abut on the shift unit, a third cylinder which has a third diameter larger than the second diameter and prevents the engagement member from falling out by abutting on a surface perpendicular to the axis when the engagement member is moved in an optical axis direction due to an external impact, and a fourth cylinder which has a fourth diameter larger than the third diameter and abuts on the elastic member and urges the urging member toward the shift unit via the elastic member.

6. The interchangeable lens according to claim 4, wherein the shift unit includes a convex portion which is convex in an optical axis direction and can move in the optical axis direction, the engagement member includes concave portion which is concave in the optical axis direction, can engage with the convex portion, and is provided at predetermined intervals, and the interchangeable lens further comprises a lock unit configured to lock rotation of the engagement member around the optical axis when the convex portion is inserted into the concave portion.

7. The interchangeable lens according to claim 4, wherein a protrusion portion is provided on an inner circumference of the engagement member, a protrusion is provided on a circumference of the shift unit having a same radius as the protrusion portion at predetermined intervals, and the engagement member comprises a regulation unit configured to regulate rotation around the optical axis at the predetermined intervals of the protrusion by the protrusion portion abutting on the protrusion at a side surface.

8. An interchangeable lens removably mounted on a camera body including an image sensor, the interchangeable lens comprising:

a tilt unit configured to move a lens unit in a tilt direction with respect to the image sensor;

a shift unit configured to move the lens unit in a shift direction with respect to the image sensor; and a changing unit configured to change a relative angle between the shift unit and the tilt unit by relatively rotating the shift unit and the tilt unit around an optical axis, wherein the changing unit comprises:

an engagement member which is fixed to the shift unit and configured to radially engage with the tilt unit, and an urging member in which its rotation motion around the optical axis is regulated with respect to the tilt unit and configured to urge the engagement member to a direction toward the tilt unit, wherein the engagement member is integrated with the shift unit around the optical axis, and relatively rotates with respect to the urging member and the tilt unit.

9. The interchangeable lens according to claim 8, wherein the changing unit urges the engagement member toward the tilt unit via the urging member by an axial screw and an elastic member, and the axial screw comprises a first cylinder which has a first diameter and in which a screw thread is formed, a second cylinder that has a second diameter which is larger than the first diameter and an abutting surface perpendicular to an axis of the axial screw and configured to abut on the tilt unit, a third cylinder which has a third diameter larger than the second diameter and prevents the engagement member from falling out by abutting on a surface perpendicular to the axis when the engagement member is moved in an optical axis direction due to an external impact, and a fourth cylinder which has a fourth diameter larger than the third diameter and abuts on the elastic member and urges the urging member toward the tilt unit via the elastic member.

10. The interchangeable lens according to claim 8, wherein the tilt unit includes a convex portion which is convex in an optical axis direction and can move in the optical axis direction, the engagement member includes concave portion which is concave in the optical axis direction, can engage with the convex portion, and is provided at predetermined intervals, and the interchangeable lens further comprises a lock unit configured to lock rotation of the engagement member around the optical axis when the convex portion is inserted into the concave portion.

11. The interchangeable lens according to claim 8, wherein a protrusion portion is provided on an inner circumference of the engagement member, a protrusion is provided on a circumference of the tilt unit having a same radius as the protrusion portion at predetermined intervals, and the engagement member comprises a regulation unit configured to regulate rotation around the optical axis at the predetermined intervals of the protrusion by the protrusion portion abutting on the protrusion at a side surface.

12. A camera system, comprising:

an interchangeable lens according to claim 1; and a camera body.

13. The camera system according to claim 12, wherein the camera body is configured to perform at least one of changing an exposure control method, correcting marginal illumination, changing a shutter drive control method, correcting aberration, and changing a focus drive control method based on a detection result from the detection unit transmitted from the interchangeable lens.

* * * * *